C. G. CURTIS.
GEARING.
APPLICATION FILED MAY 12, 1910.
1,114,234.
Patented Oct. 20, 1914.
2 SHEETS—SHEET 1.
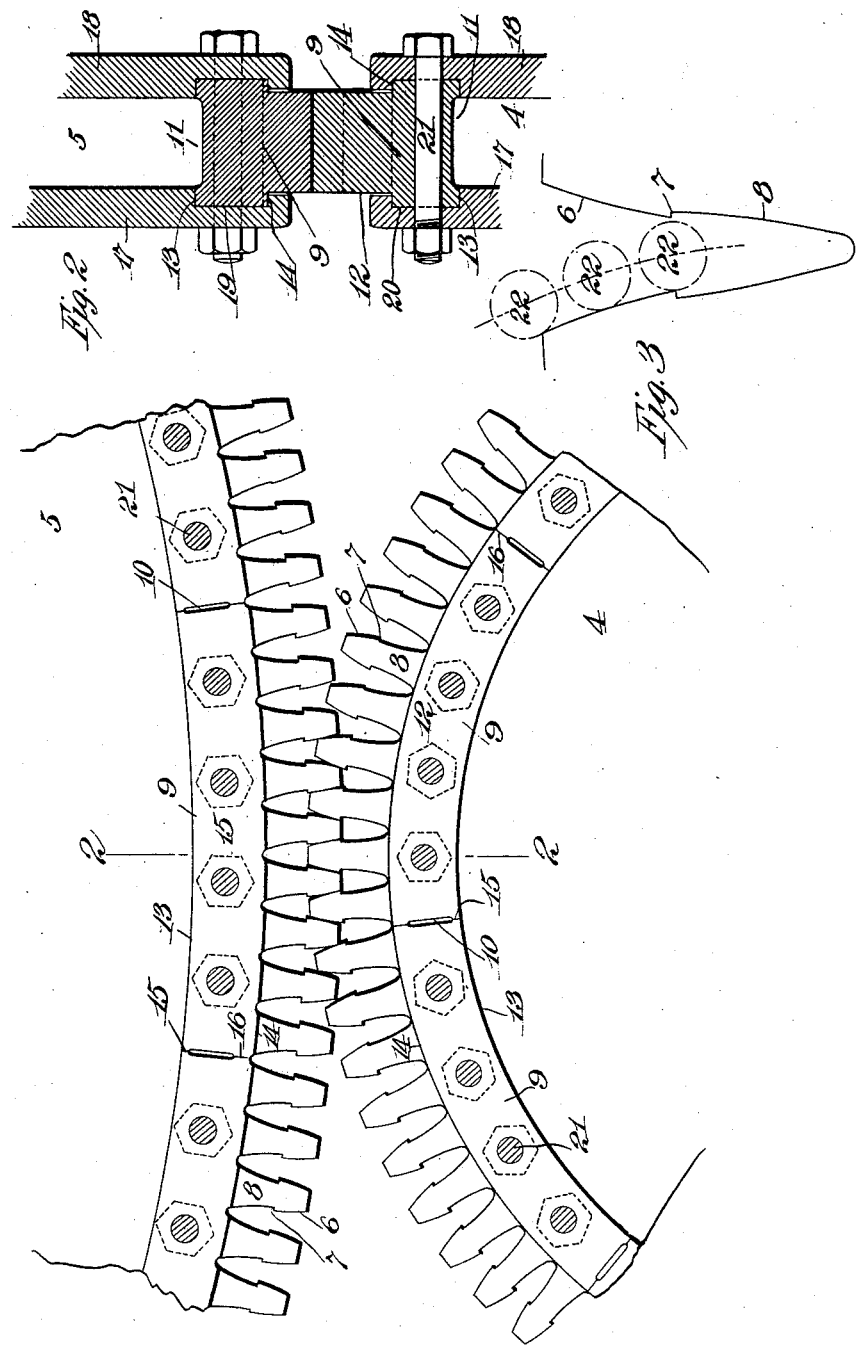
Witnesses:
Jas. F. Coleman
John L. Lotsch
Inventor
Charles G. Curtis
By
Dyer, Dyer & Taylor
Attorneys.

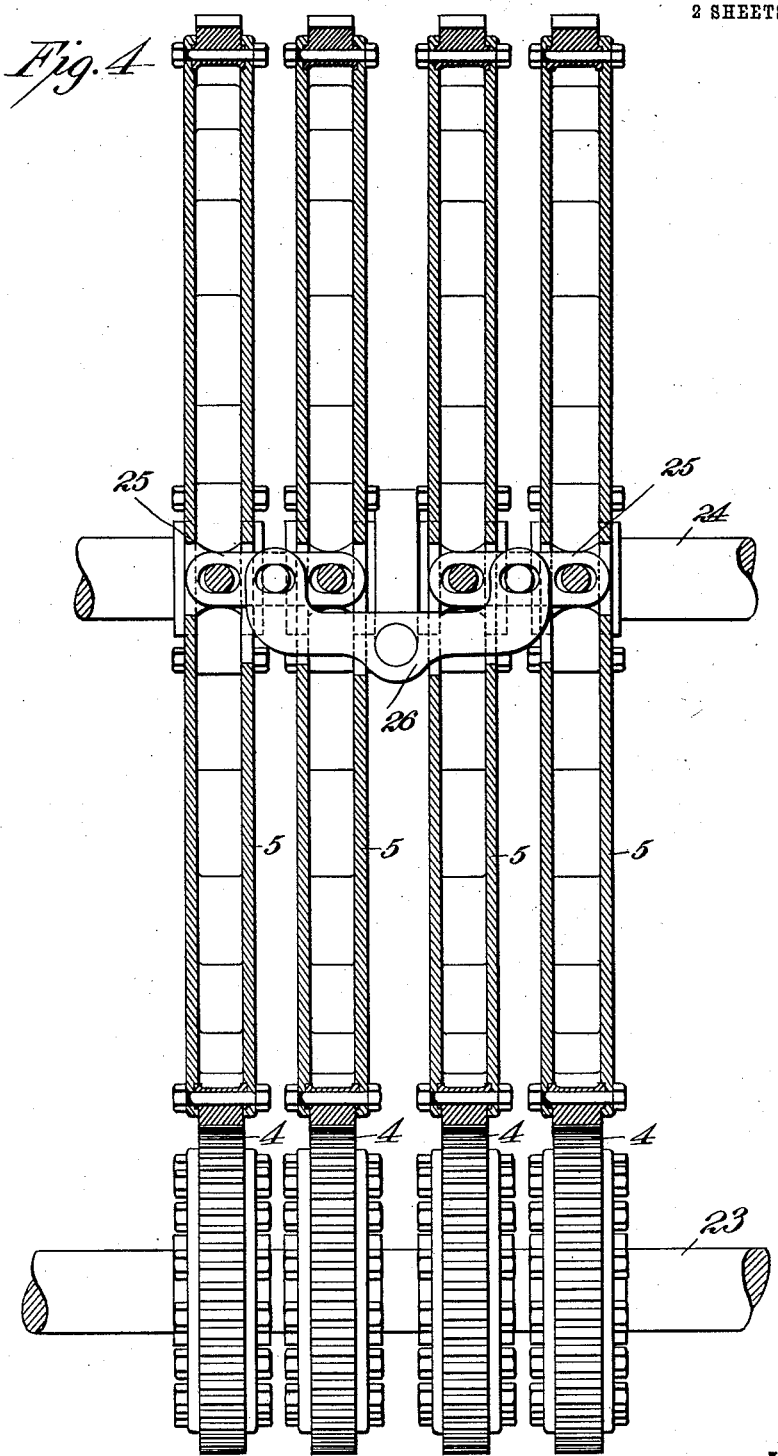

UNITED STATES PATENT OFFICE.

CHARLES G. CURTIS, OF NEW YORK, N. Y.

GEARING.

1,114,234.   Specification of Letters Patent.   Patented Oct. 20, 1914.

Application filed May 12, 1910. Serial No. 560,872.

*To all whom it may concern:*

Be it known that I, CHARLES G. CURTIS, a citizen of the United States, residing in the borough of Manhattan, city, county, and State of New York, have invented a certain new and useful Improvement in Gearing, of which the following is a specification.

In gearing designed to transmit heavy loads, such, for example, as to produce a speed reduction between a steam turbine and the propeller shaft of a vessel driven thereby, as described in my applications Serial Nos. 529,512, and 529,513, filed November 23rd, 1909, I have found it desirable, in order to reduce the number of gears required to transmit the load, to produce gears which will stand without breaking or excessive wear much greater strains than have heretofore been possible.

My invention involves two features: (1) The production of accurately made and fitted gears having teeth formed of hardened wrought steel; and (2) the provision of gear teeth which individually spring or yield elastically under the stress of the load, so as to distribute with substantial equality the load between two or more pairs of teeth in mesh at the same time, and also so as to distribute with substantial equality the stress upon each tooth throughout the lateral or axial length of its bearing surface. These two features of invention may be combined in the same gearing or may be separately employed.

In carrying out the first feature of invention, I make both the larger and smaller wheels of a pair of wheels sufficiently large in diameter to permit of a sectional construction, i. e., one in which the gear teeth of each wheel are divided into a number of separate segments, each consisting of a base block of the proper curvature carrying a number of teeth projecting radially therefrom and made integral therewith. These teeth segments are made of high grade wrought steel, each segment being forged and machined to the proper shape, and the teeth being formed on its periphery or convex side. The segment is then hardened in the usual way and is subsequently brought to the exact shape and size required by grinding. A number of these segments assembled together and clamped between flanges or disks form the periphery of the gear wheel. By constructing the gear wheels in this manner great accuracy of finish can be secured, so that an accurate mesh of the teeth will be possible. The teeth of both wheels being of hardened steel will withstand great pressures without excessive wear, so that a large amount of power can be transmitted through a single pair of gears.

In carrying out the second feature of invention, the gear teeth are provided with shanks extending from the bearing surfaces of the teeth to the base from which the teeth project, such shanks being so proportioned with relation to the load the teeth are designed to carry, that the teeth will individually spring or yield elastically to a sufficient extent to compensate for slight inequalities, so that the load will be distributed with substantial equality between the two or more pairs of teeth in mesh at the same time, and also with substantial equality throughout the extent of the lateral or axial bearing surface of individual teeth.

In the accompanying drawing, Figure 1 is an elevation and partial section showing gear wheels embodying my invention; Fig. 2 is a sectional view on line 2, 2, of Fig. 1; Fig. 3 is a diagram illustrating the grinding of a bearing surface of one of the teeth; and Fig. 4 is a view partly in section showing a group of the improved gear wheels arranged to transmit a heavy load and reduce speed.

The gear wheel 4 is the wheel of smaller diameter which may, for illustration have a pitch diameter of three feet, while the gear wheel 5 has a larger diameter such, for illustration, as a pitch diameter of nine feet. Each of these wheels has gear teeth provided with curved bearing surfaces 6 terminating at shoulders 7, beyond which the teeth are provided with shanks 8 extending to curved bases 9, with which the teeth are made integral. The gear teeth of each wheel are divided into sections, each composed of a base block 9, and the teeth projecting therefrom. Each of these segments is made from high grade wrought steel which is forged and machined into the proper curved shape and has its outer surface or periphery cut or otherwise formed to produce the teeth. Holes are made laterally in the bases 9 to receive the clamping bolts, and recesses 10 are formed at the meeting ends of the sections, and other recesses 11 are formed on the concave faces of the sections so as to reduce the extent of the surfaces which must be subsequently finished by grinding. The teeth sections are then hardened in the usual way, and, after hardening, the bases 9 are ground to accurate shape and size on their sides 12 as well as on their inner and outer edges 13, 14, and also on their ends to form the bearing surfaces 15, 16. These teeth sections are assembled to form the wheel and are clamped between disks 17, 18, having properly machined grooves 19, 20, to receive them. These disks may form the flanges of the wheel or its entire web. The teeth sections are held between the disks by clamping bolts 21 which pass through the bases of the sections and through the disks as illustrated. Either before or after the teeth sections are assembled the bearing surfaces of the teeth are accurately formed by means of grinding wheels 22, (Fig. 3) or in any other suitable way.

Gear wheels made and assembled in this way will not only stand very great strains without excessive wear, but the accuracy with which they can be made and fitted will enable the strains to be distributed with substantial equality between a number of pairs of teeth in mesh. For the same reason the teeth of the wheels can be made of considerable width, so as to secure a long lateral or axial bearing surface between the teeth of each pair. The slight inaccuracy in the bearing of two or more pairs of teeth will be compensated for by the spring of the teeth. The elasticity afforded by the extended shanks will also permit the teeth to twist to a slight extent, so as to equalize the load throughout the extent of the lateral or axial bearing surfaces. With gear wheels of this construction having gear teeth four inches wide, I expect to be able to transmit as much as 2,000 horse power, or even more, with a single pair of gear wheels.

For transmitting heavy loads such as are met with in marine propulsion by steam turbines, a single pair of these gear wheels will not, however, be sufficient. A number of pairs of these wheels will be employed arranged so that the load will be distributed between them by relative circumferential self-adjustment of the gears as described in my applications referred to.

In Fig. 4 four pairs of the gear wheels 4, 5 are shown mounted upon the shafts 23, 24. The wheels 5 are free to turn on the shaft 24. Adjacent wheels 5 are connected by two primary equalizing bars 25 and the two bars 25 are connected together and with the shaft 24 by a secondary equalizing bar 26. By this means the load will be distributed and substantially equalized between the several gears. It is evident that any of the arrangements shown in my applications referred to may be employed for this purpose.

What I claim is—

1. In a gearing for transmitting heavy loads, the combination with two shafts, of a number of intermeshing tooth gears mounted on such shafts and transmitting motion from one shaft to the other, such gears having elastic teeth adapted to yield individually to distribute the load between a number of teeth, substantially as set forth.

2. In a gearing for transmitting heavy loads, the combination with two shafts, of a number of intermeshing tooth gears mounted on such shafts and transmitting motion from one shaft to the other, such gears having elastic teeth adapted to yield individually to distribute the load between a number of teeth, and means for equalizing the load between the several gears, substantially as set forth.

This specification signed and witnessed this ninth day of May, 1910.

CHARLES G. CURTIS.

Witnesses:
JOHN L. LOTSCH,
HENRY F. CONRAD.